United States Patent
Masegi

(10) Patent No.: US 6,292,728 B1
(45) Date of Patent: *Sep. 18, 2001

(54) COLLISION-DETERMINING CIRCUIT FOR VEHICLE AIRBAG SYSTEM WITH DEVICE MALFUNCTION MONITORING FEATURE

(75) Inventor: Mitsuhiko Masegi, Nukata-gun (JP)

(73) Assignee: Denso Corporation, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,981

(22) Filed: May 21, 1999

(30) Foreign Application Priority Data

| | | |
|---|---|---|
| May 22, 1998 | (JP) | 10-141653 |
| Jan. 20, 1999 | (JP) | 11-012350 |
| Mar. 25, 1999 | (JP) | 11-082184 |

(51) Int. Cl.[7] .............. B60R 22/00; G06F 7/00; G06F 17/00
(52) U.S. Cl. ............. 701/45; 701/46; 701/47; 180/282; 180/232; 180/273; 180/272; 340/436; 340/667; 280/734; 280/735
(58) Field of Search ................. 701/45, 46, 47; 280/735, 734; 180/272, 282, 232, 273; 340/436, 665, 667, 989

(56) References Cited

U.S. PATENT DOCUMENTS

| | | | |
|---|---|---|---|
| 4,836,024 | 6/1989 | Woehrl et al. | 73/514 |
| 5,038,134 | 8/1991 | Kondo et al. | 340/438 |
| 5,782,485 | * 7/1998 | Takeda et al. | 280/735 |
| 5,783,871 | * 7/1998 | LeMense | 307/10.1 |
| 5,787,377 | * 7/1998 | Watanabe et al. | 701/45 |
| 5,890,084 | * 3/1999 | Halasz et al. | 701/45 |
| 6,070,113 | * 5/2000 | White et al. | 701/45 |
| 6,076,028 | * 6/2000 | Donnelly et al. | 701/45 |
| 6,104,972 | * 8/2000 | Miyamoto et al. | 701/45 |
| 6,109,648 | * 8/2000 | Luo et al. | 280/735 |
| 6,115,659 | * 9/2000 | Buchheim et al. | 701/45 |

* cited by examiner

Primary Examiner—William A. Cuchlinski, Jr.
Assistant Examiner—Ronnie Mancho
(74) Attorney, Agent, or Firm—Pillsbury Winthrop LLP

(57) ABSTRACT

A collision-determining device arranged to prevent a passenger protection mechanism from erroneously operating by determining the polar relationship between an acceleration signal indicative of vehicle acceleration and a pseudo signal used to determine whether a vehicle collision has occurred. A G sensor generates the pseudo signal having a polarity opposite from that of a deceleration signal based on a control signal from a microcomputer. An A-D converter receives the pseudo signal via a signal processing circuit and generates a pseudo voltage. The microcomputer determines whether a collision has occurred based on whether the pseudo voltage has been generated and based on the polarity thereof.

28 Claims, 17 Drawing Sheets

FIG. 10
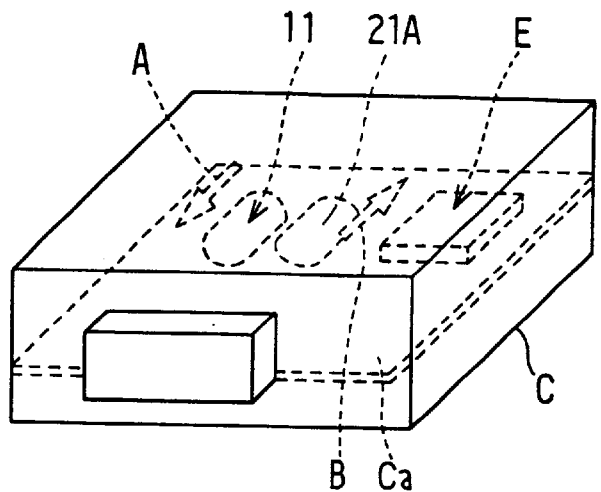
FIG. 11A
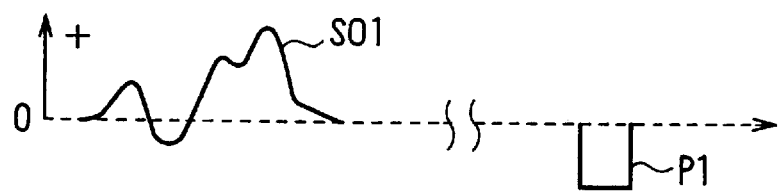
FIG. 11B
FIG. 11C
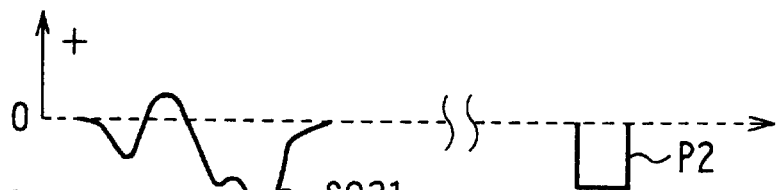

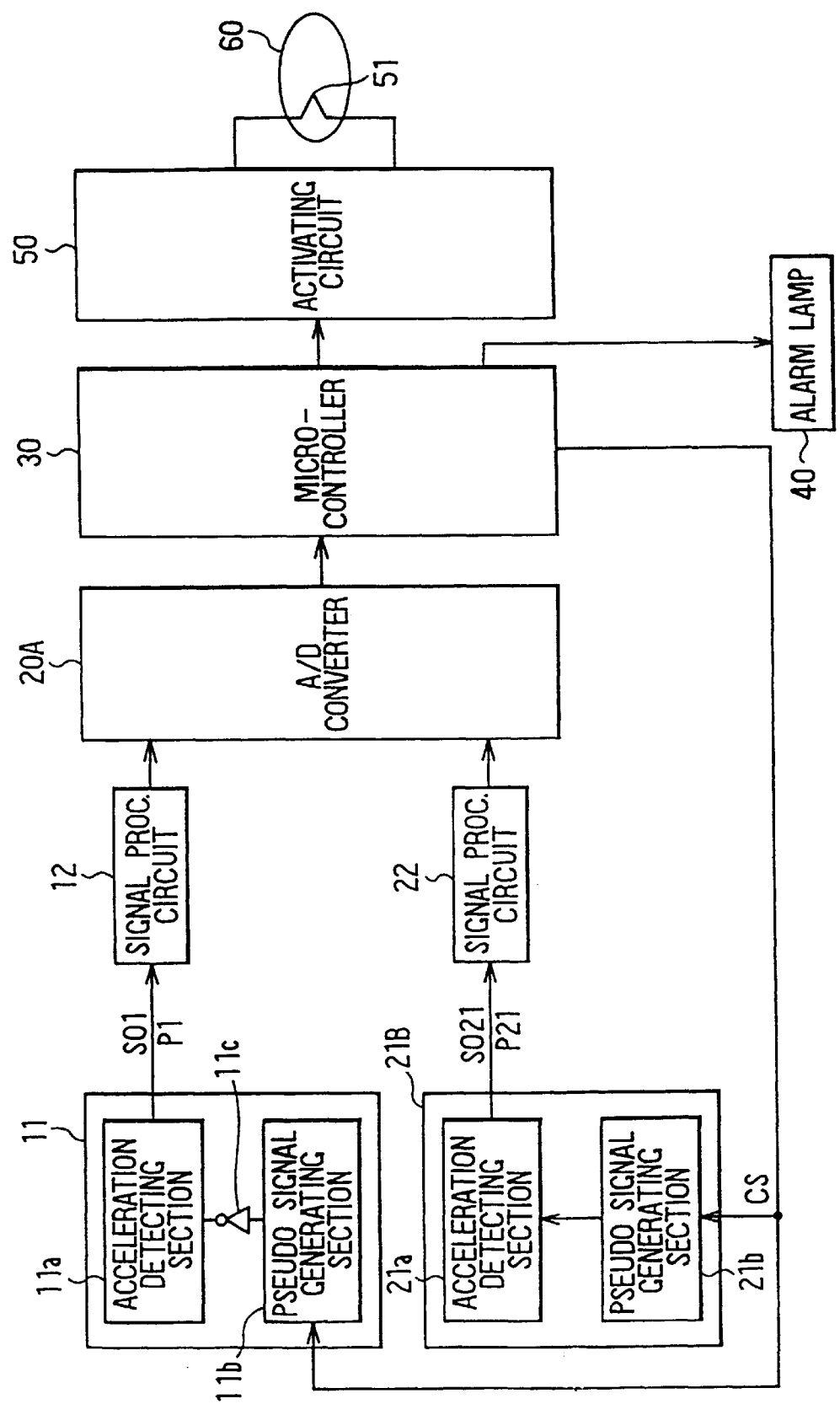

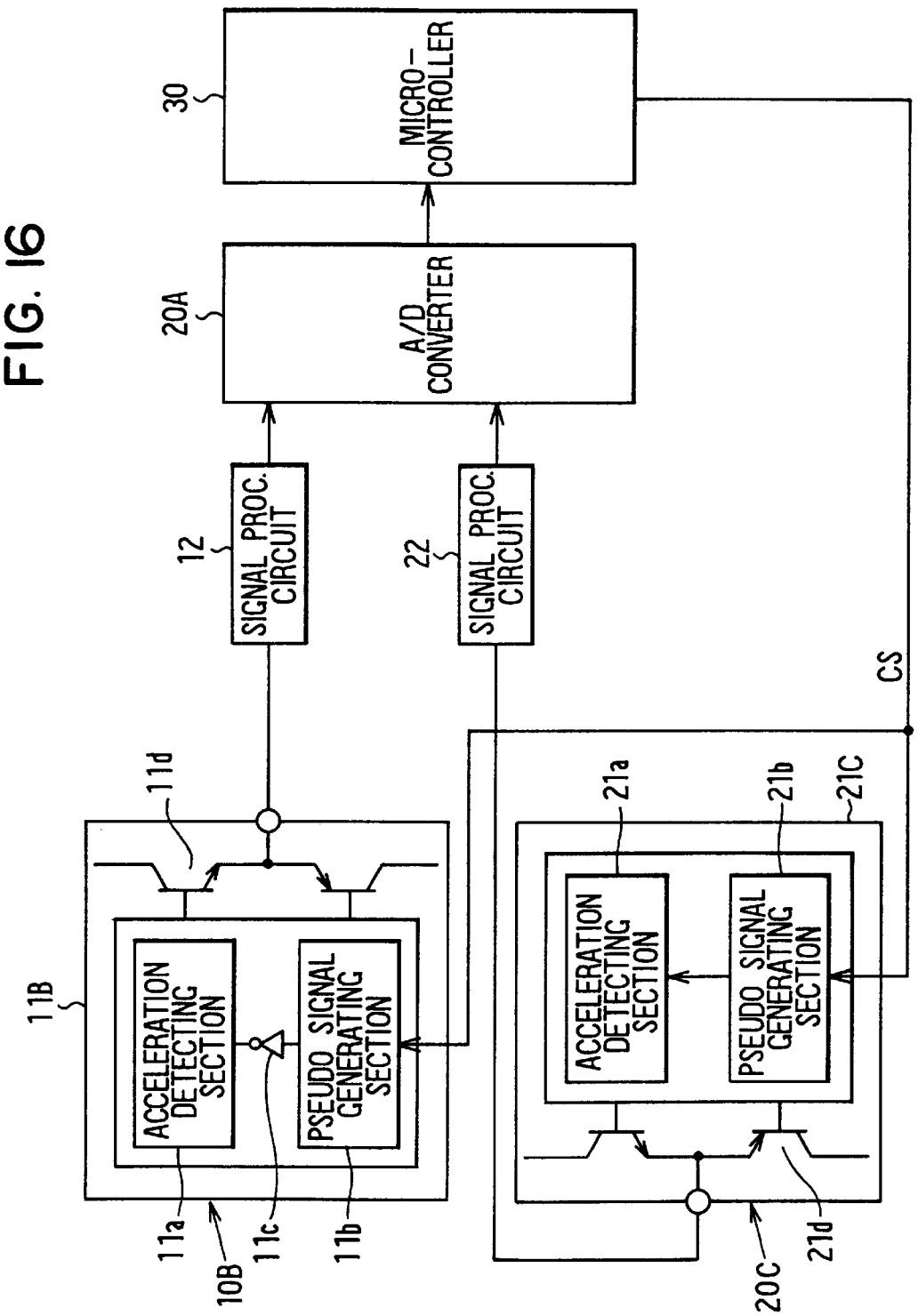

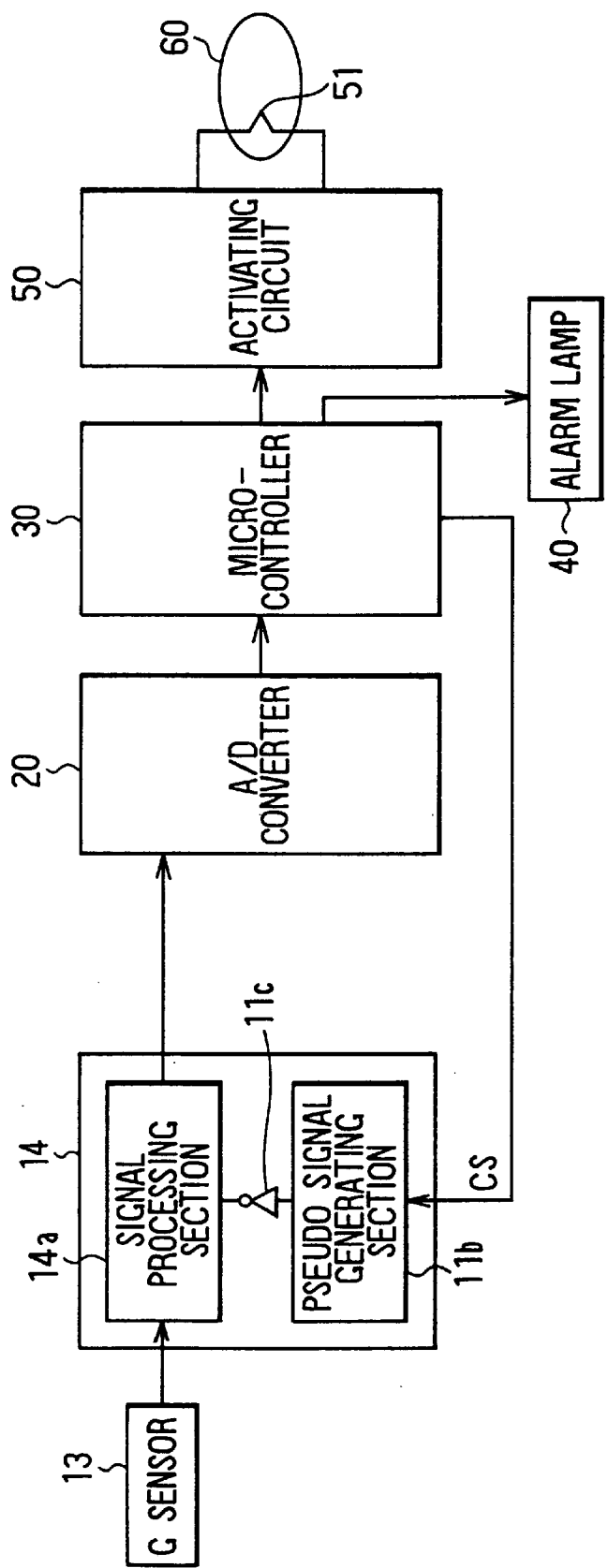

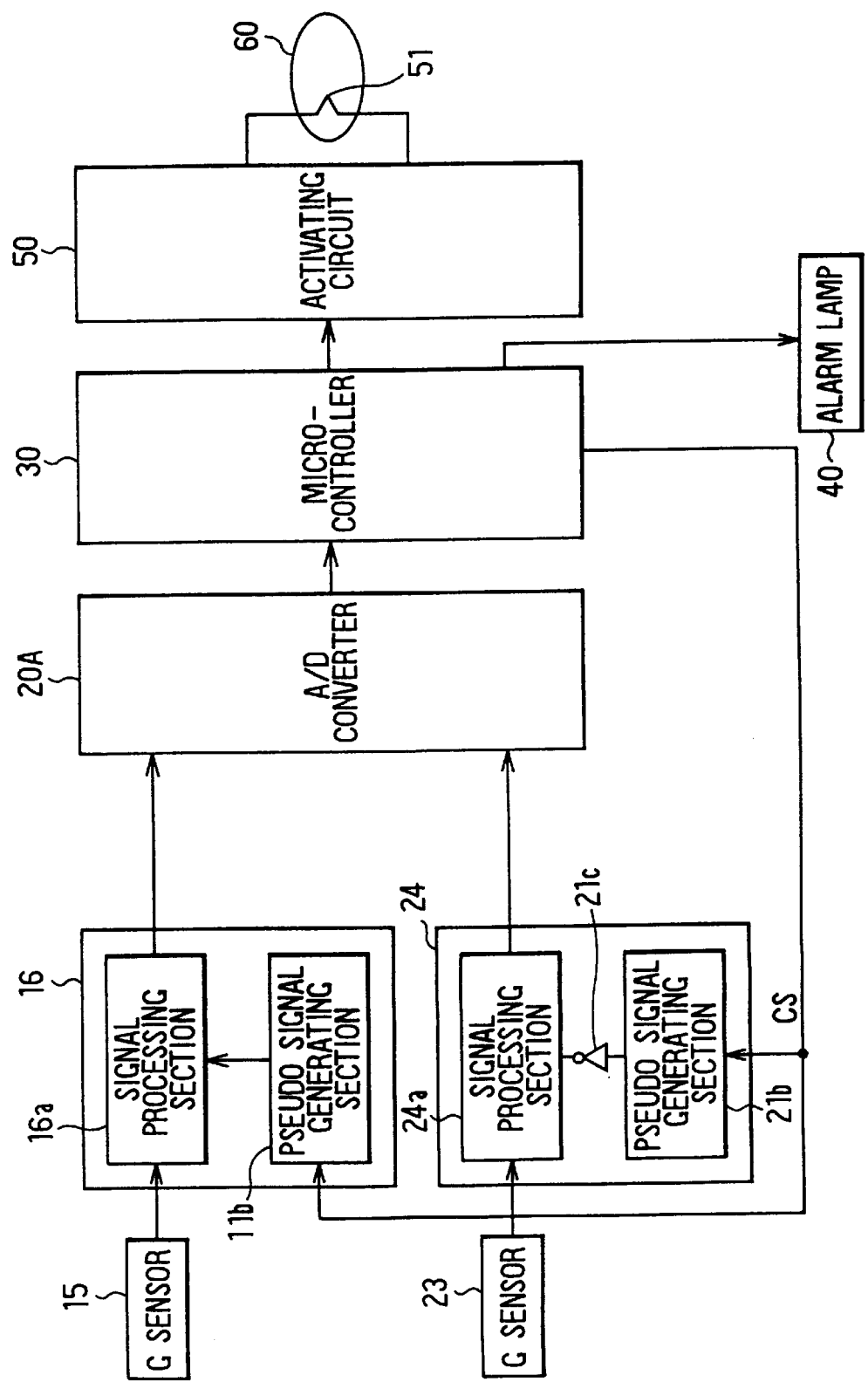

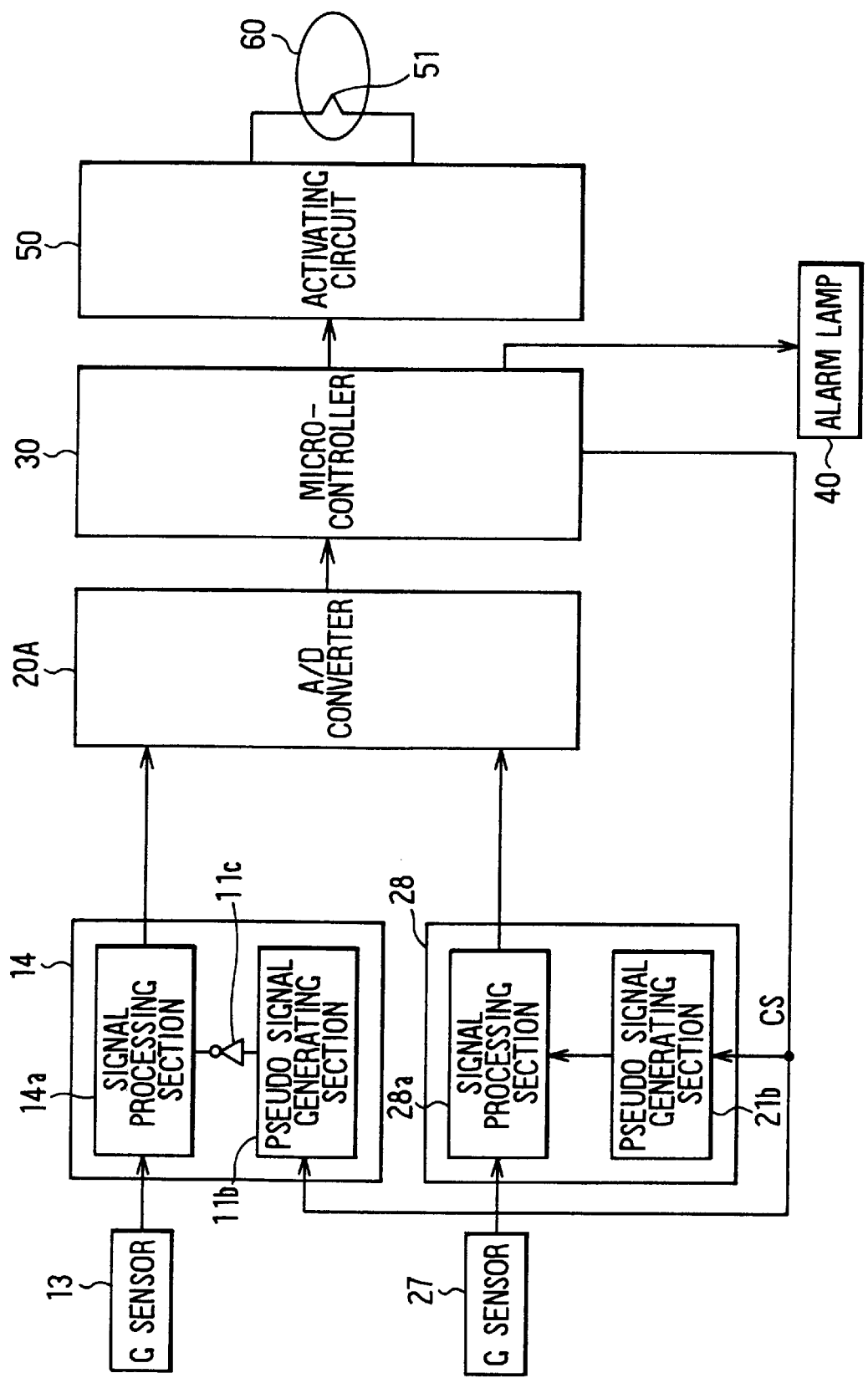

COLLISION-DETERMINING CIRCUIT FOR VEHICLE AIRBAG SYSTEM WITH DEVICE MALFUNCTION MONITORING FEATURE

CROSS-REFERENCE TO RELATED APPLICATIONS

The present application is related to, and claims priority from, Japanese Patent Application Nos. Hei. 10-141653, 11-12350 and 11-82184, the contents of which are incorporated herein by reference.

BACKGROUND OF THE INVENTION

1. Field of the Invention

The present invention relates to a passenger protection system such as a vehicle air bag system, and more particularly to a collision-determining circuit of the passenger protection system for determining whether or not a collision has occurred, and for preventing erroneous system deployment.

2. Discussion of the Related Art

Conventional collision determination devices are of the type shown, for example, in U.S. Pat. No. 5,038,134. As shown in FIG. 21, such a collision determination device generates, prior to determining whether or not a collision has occurred, a pseudo signal 2 from an acceleration sensor based on a control signal 1 to determine whether an air bag system is malfunctioning based on the pseudo signal 2.

However, as shown in FIG. 21, the polarity of the pseudo signal 2 is the same as that of an acceleration signal 3 generated from the acceleration sensor when the vehicle is involved in a collision.

Therefore, the airbag system may be activated erroneously as the pseudo signal 2 is generated when the pseudo signal 2 is erroneously output even though no acceleration signal is generated.

Further, when a plurality of acceleration sensors are implemented in the collision detection system, the above-discussed limitation still remains, as the control signal 1 is used in common in the respective acceleration sensors. Accordingly, the air bag system may be erroneously activated in the same manner as described above.

SUMMARY OF THE INVENTION

Accordingly, it is an object of the present invention to solve the above-mentioned problems by providing a collision-determining circuit in a vehicle passenger protection system in which the polar relationship between an acceleration signal indicative of acceleration of a vehicle and a pseudo signal used to determine a fault prevents a passenger protecting mechanism from erroneously operating even if the pseudo signal is generated.

It is another object of the invention to provide a collision-determining circuit in which the polar relationship between at least two acceleration signals prevents the passenger protecting mechanism from operating erroneously.

The above-mentioned objects may be achieved as follows. According to one aspect of the present invention, it is possible to determine whether an acceleration detector is out of order without erroneously operating a passenger protecting mechanism of a passenger protection system by generating a pseudo signal having a polarity that is opposite from the polarity of a deceleration signal.

Further, even if the control signal is generated erroneously during operation of the collisiondetermining device, the passenger protecting mechanism will not operate erroneously due to the pseudo signal. This is because the polarity of the pseudo signal generated based on the control signal has a polarity that is opposite from the polarity of the deceleration signal.

According to another aspect of the present invention, it is also possible to determine whether or not one or more acceleration detectors are out of order without erroneously operating the passenger protecting mechanism, because the polarity of the deceleration and pseudo signals generated by at least one of the acceleration detectors are opposite from one other.

Even if the control signal is generated erroneously during the determination process of the collision-determining circuit, the passenger protection mechanism will not be erroneously activated by the pseudo signal when no deceleration signal caused by a collision of the vehicle is generated, because the polarity of the pseudo signal generated based on the control signal is opposite in polarity from that of the corresponding deceleration signal. Accordingly, it is possible to provide a highly reliable collision-determining device.

The specific nature of the invention, as well as other objects, uses and advantages thereof, will clearly appear from the following description and from the accompanying drawings in which like numerals refer to like parts.

BRIEF DESCRIPTION OF THE DRAWINGS

FIG. 10 is a perspective view showing a state in which each circuit in FIG. 9 is stored in a casing;

FIG. 11A is a timing diagram of the acceleration signal and the pseudo signal of a G sensor, FIG. 11B is a timing diagram of the acceleration signal and the pseudo signal of another G sensor, and FIG. 11C is a timing diagram of the microcomputer control signal;

FIG. 13 is a modified example of the third embodiment, wherein

FIG. 11C is a timing diagram of the microcomputer control signal;

FIG. 14 is a block diagram showing a fourth embodiment of the invention;

FIG. 16 is a block diagram showing a fifth embodiment of the present invention;

FIG. 17 is a block diagram showing a sixth embodiment of the present invention;

FIG. 18 is a block diagram showing a seventh embodiment of the present invention;

FIG. 20 is a block diagram showing a ninth embodiment of the present invention.

DETAILED DESCRIPTION OF THE PREFERRED EMBODIMENTS

First Embodiment

Figure 1:
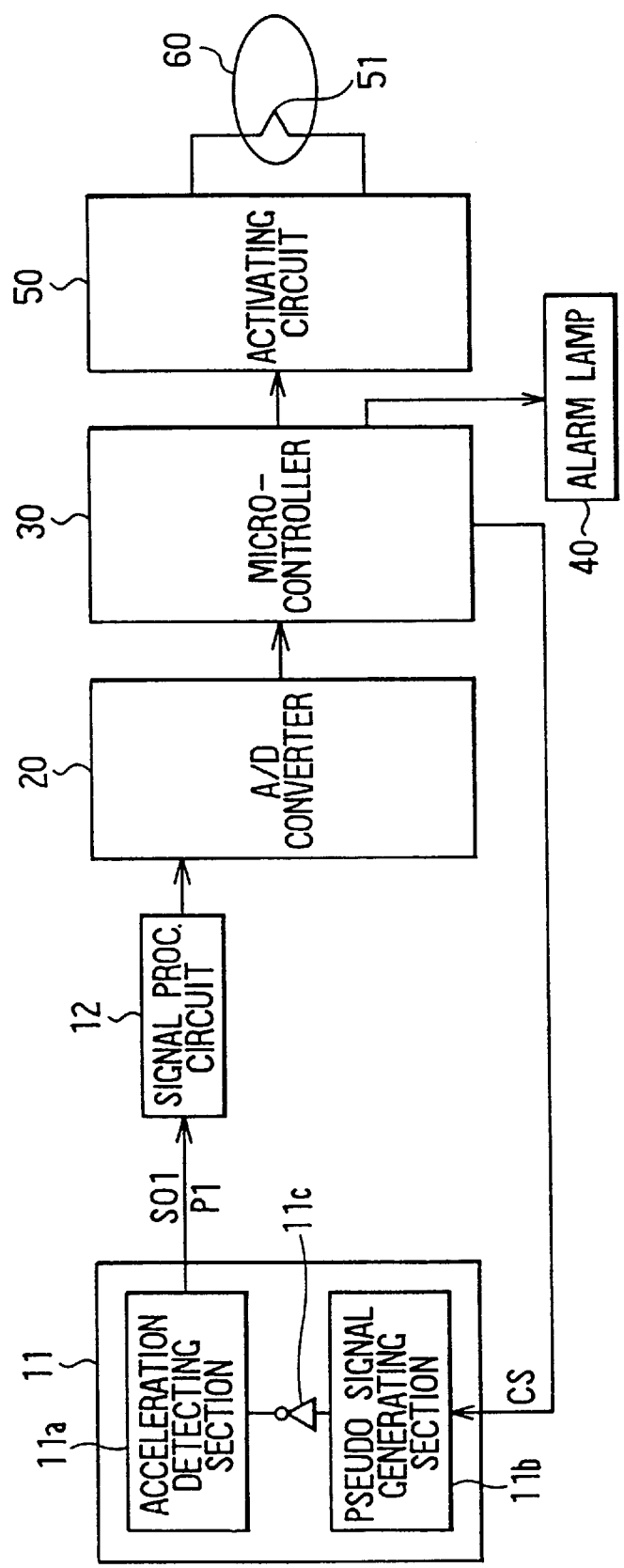
FIG. 1 is a block diagram showing a first embodiment of the present invention.
Figure 2:
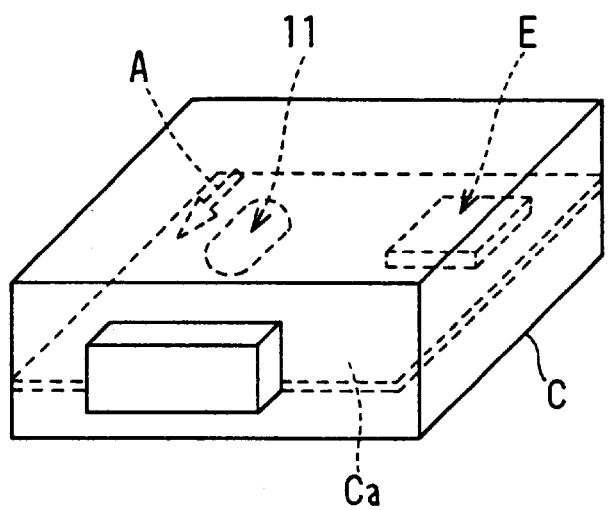
FIG. 2 is a perspective view showing a state in which each circuit in FIG. 1 is stored in a casing.

FIG. 1 shows a collision-determination circuit according to the present invention applied to a vehicle air bag system. The air bag system comprises an acceleration detecting circuit mounted on a circuit board Ca within a casing C disposed within the vehicle as shown in FIG. 2. Preferably, the circuit board Ca is supported within the casing C in parallel with a bottom wall of the casing.

The acceleration detecting circuit comprises an acceleration sensor 11 (hereinafter referred to as a G sensor 11) including an acceleration detecting section 11a, a pseudo signal generating section 11b and an inverter tic.

Figure 3A:
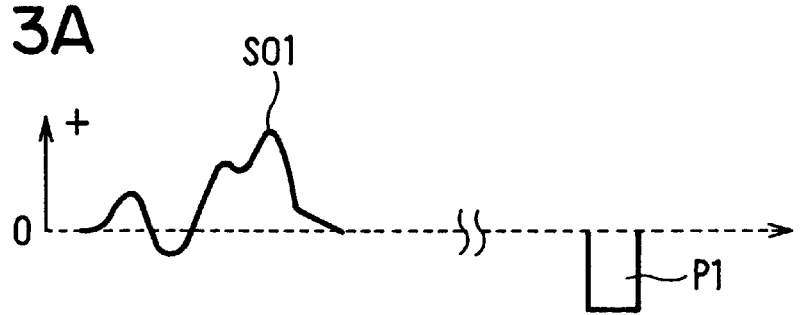
FIG. 3A is a timing diagram of a G sensor acceleration signal and pseudo signal.

The G sensor 11 is mounted in the acceleration detecting section 11a on the circuit board Ca to detect vehicle acceleration in the direction of arrow A in FIG. 2 (in the direction from the front to the back of the vehicle) and to generate an acceleration signal (see reference symbol SO1 in FIG. 3A). The G sensor 11 generates a deceleration signal when deceleration due to a collision is produced.

Figure 3B:
FIG. 3B is a timing diagram of a microcomputer control signal.

The pseudo signal generating section 11b generates a pulse-width pseudo signal (i.e. diagnostic signal) upon receiving a positive pulse-width control signal CS (see FIG. 3B) from a microcomputer 30. The inverter 11c generates an inversion signal (see FIG. 3A, hereinafter referred to as a pseudo signal P1) by inverting the pseudo signal from the pseudo signal generating section 11b and outputs it through the acceleration detecting section 11a. According to the present embodiment, the acceleration detecting section 11a outputs the acceleration signal SO1 or the pseudo signal P1 from the same output terminal, with the P1 signal having a polarity opposite from that of the positive part of the acceleration signal SO1.

Referring again to FIG. 1, the acceleration detecting circuit also comprises a signal processing circuit 12. The signal processing circuit 12 amplifies the acceleration signal SO1 and generates a processed pseudo signal by processing the pseudo signal P1 from the acceleration detecting section 11a.

The air bag system comprises an A-D converter 20 and a microcomputer 30 as shown in FIG. 1. The A-D converter 20 and the microcomputer 30 are provided on the circuit board Ca within the casing C (see the reference symbol (E) in FIG. 2). The microcomputer 30 converts the processed acceleration signal or the processed pseudo signal from the signal processing circuit 12 into digital signals to generate acceleration voltage or pseudo voltage.

Figure 4:
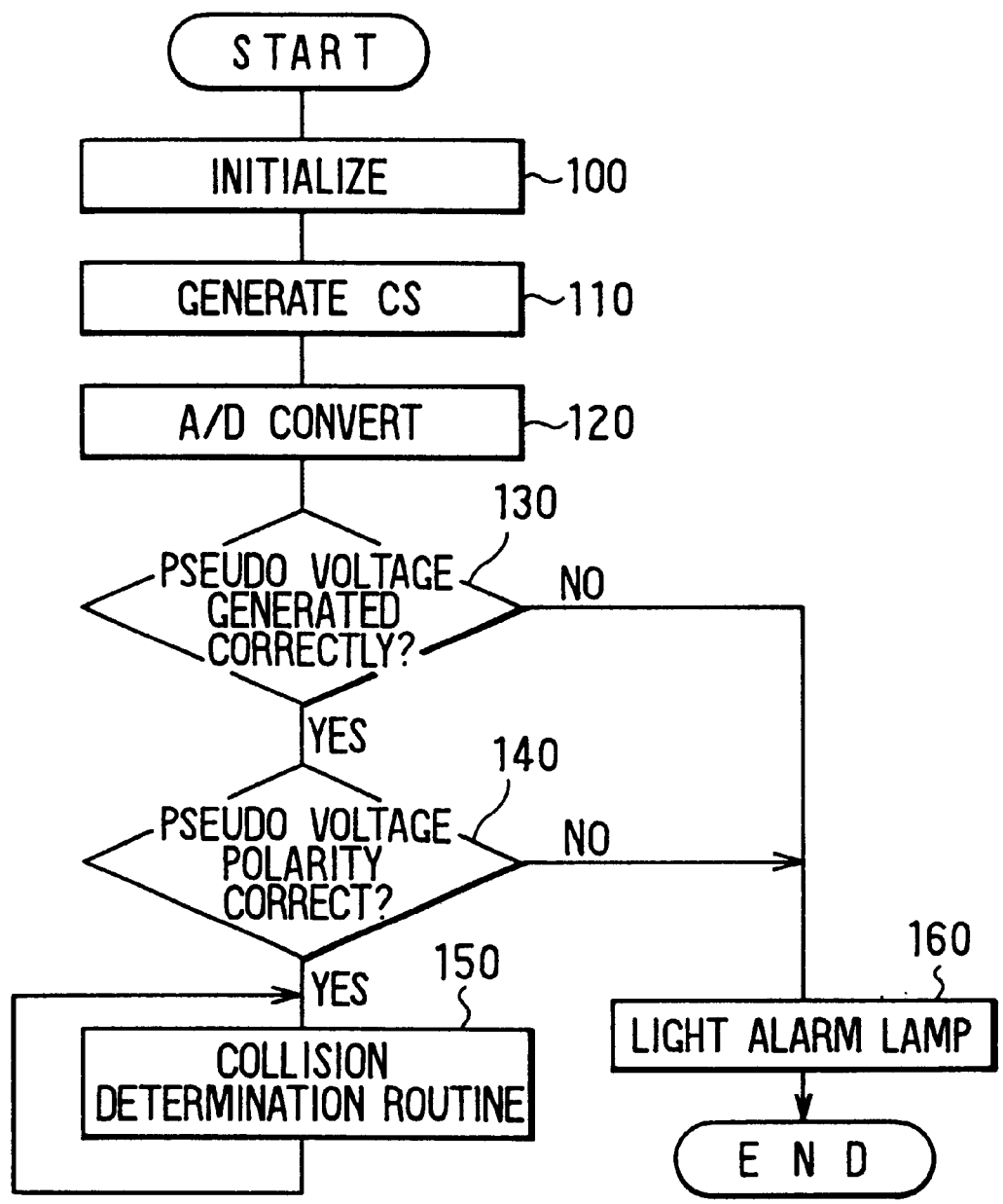
FIG. 4 is a flow diagram showing an operation of the microcomputer in FIG. 1.
Figure 5:
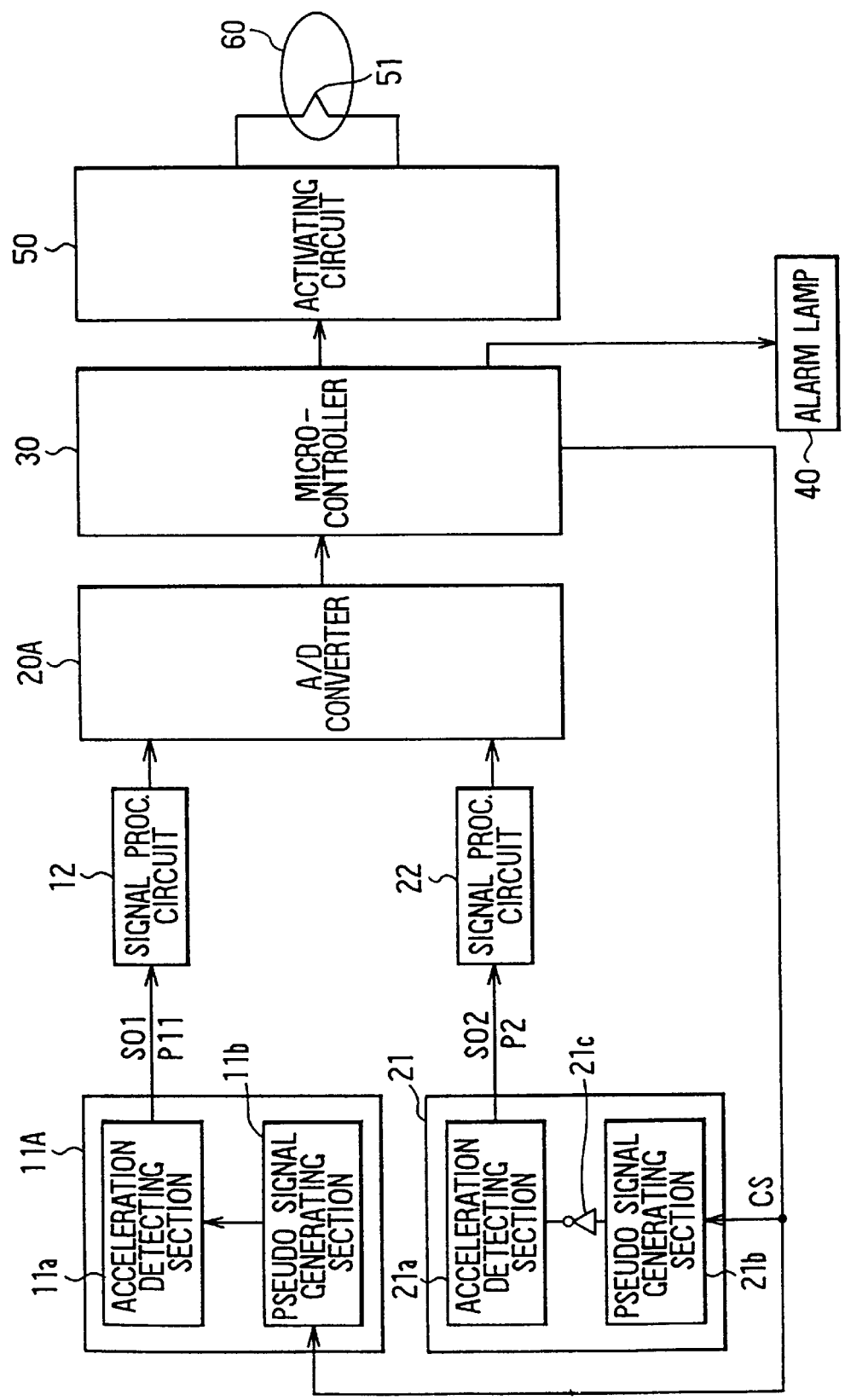
FIG. 5 is a block diagram showing a second embodiment of the invention.

The A-D converter 20 executes a computer program in accordance to a flow diagram in FIG. 4 and implements an arithmetic process for controlling the pseudo signal generating section 11b of the G sensor 11, a fault-determining process and a collision-determining process based on an output of the A-D converter 20, and a process for controlling an alarm lamp 40.

The collision-determining process is carried out by determining whether or not a required condition for operating an airbag mechanism 60 exists based on the acceleration voltage from the A-D converter 20. The process determines that the vehicle has been involved in a collision when the required condition exists, or determines that the vehicle has not been involved in a collision when the required condition does not exist.

An activating circuit 50 activates a squib 51 when the microcomputer 30 determines that the air bag mechanism 60 must be activated. The air bag mechanism 60 operates based on the activation of the squib 51, and correspondingly inflates the air bag.

When an ignition switch of the vehicle is turned on in the first embodiment constructed as described above, the microcomputer 30 starts to execute the computer program according to the flow diagram shown in FIG. 4.

At Step 100, the microcomputer 30 is initialized. After being initialized, the microcomputer generates the control signal CS necessary for generating the pseudo signal P1 from the G sensor 11 and outputs the control signal CS to the pseudo signal generating section 11b of the G sensor 11 at Step 110.

Then, the pseudo signal generating section 11b outputs the pseudo signal P1 based on the control signal CS via the inverter 11c and the acceleration detecting section 11a. Receiving the pseudo signal P1 from the acceleration detecting section 11a, the signal processing circuit 12 processes the signal to generate the processed pseudo signal, and outputs the signal to the A-D converter 20.

When the processed pseudo signal is thus output from the signal processing circuit 12 to the A-D converter 20, the processed pseudo signal is converted into a digital signal by the A-D converter 20 and is input to the microcomputer 30 as pseudo voltage at Step 120.

It is then determined whether or not the pseudo voltage is generated correctly from the acceleration detecting section 11a at Step 130. When the pseudo voltage is generated from the A-D converter 20 as described above, a YES determination is generated at Step 130, indicating that the A-D converter is functioning properly.

Next, it is determined whether the polarity of the pseudo voltage is correct at Step 140. When the pseudo signal P1 from the G sensor 11 is negative, the processed pseudo signal from the signal processing circuit 12 is negative, and the pseudo voltage from the A-D converter 20 has a value corresponding to the processed pseudo voltage. Accordingly, the polarity of the pseudo voltage is determined to be correct, and it is determined that the acceleration detecting circuit is also functioning properly, as the answer is determined to be YES at Step 140.

Subsequently, a collision-determining process is implemented at Step 150. When the vehicle is running and the acceleration detecting section 11a of the G sensor 11 generates the acceleration signal SO1, the signal processing circuit 12 processes the acceleration signal SO1 and generates a processed acceleration signal. Then, the processed acceleration signal is converted into a digital signal by the A-D converter 20 and is output as an acceleration voltage to be input to the microcomputer 30. When the microcomputer 30 determines that the above-mentioned operating requirement exists based on the acceleration voltage, the activating circuit 50 activates the squib 51, and the air bag mechanism 60 is activated to expand the air bag. As a result, a vehicle passenger is reliably protected.

Even when the control signal CS is generated erroneously, the polarity of the pseudo signal P1 generated from the G sensor 11 is opposite from that of the acceleration signal SO1 from the G sensor 11 as shown in FIG. 3. Therefore, the output of the A-D converter 20 has a value that will not activate the airbag mechanism 60. Accordingly, the airbag mechanism 60 will not be activated erroneously.

When the pseudo voltage from the A-D converter 20 is not generated correctly at Step 130 before the YES determination is made at Step 140 as described above, the determination at Step 130 turns out to be NO. This indicates that the acceleration detecting circuit is not functioning properly.

Even when a YES determination is made at Step 130, a NO determination is made at Step 140 if the polarity of the pseudo voltage is not negative at Step 140. This indicates that the acceleration detecting circuit 10 is not functioning properly.

When a NO determination is made at Steps 130 or 140 as described above, the collision determination processing routine 150 is inhibited, and an alarm lamp 40 is lit at Step 160. As a result, the airbag mechanism 60 will not operate erroneously, and the alarm lamp 40 is illuminated to inform the vehicle driver of the error.

As discussed above, the polarity of the acceleration signal SO1 is opposite from that of the pseudo signal P1. That is, the polarity of the pseudo signal P1 is opposite from the polarity of the signal operating the air bag mechanism 60. Therefore, the air bag mechanism 60 will not operate erroneously due to the pseudo signal P1 prior to operation of the collision determination processing routine at Step 150, thus increasing the reliability of the collision-determination circuit.

Second Embodiment

FIGS. 5–8 show a second embodiment of the present invention in which multiple acceleration detectors are utilized. In the second embodiment, acceleration detecting circuits 11A and 21 and an A-D converter 20A are adopted instead of the acceleration detecting circuit 11 and the A-D converter 20 described in the first embodiment.

The acceleration detecting circuit includes a G sensor 11A instead of the G sensor 11 in the first embodiment, and has a structure in which the inverter 11c is eliminated from the G sensor 11.

Therefore, the pseudo signal generating section 11b outputs a positive pulse-width pseudo signal P11 (see FIG. 7A) through the acceleration detecting section 11a. Here, the pseudo signal P11 has the same polarity as the acceleration signal SO1 from the acceleration detecting section 11a. It is noted that instead of the G sensor 11 described above, the G sensor 11A is mounted on the circuit board Ca within the casing C so as to have the same detecting direction with the G sensor 11.

The acceleration detecting circuit 20' comprises a G sensor 21 and a signal processing circuit 22. The acceleration detecting circuit 20' is mounted on the circuit board Ca together with the G sensor 11A (see FIG. 6), instead of with the G sensor 11 described in the first embodiment.

The G sensor 21 comprises an acceleration detecting section 21a and a pseudo signal generating section 21b which have the same functions with the acceleration detecting section 11a and the pseudo signal generating section 11b of the G sensor 11A and an inverter 21c.

Figure 6:
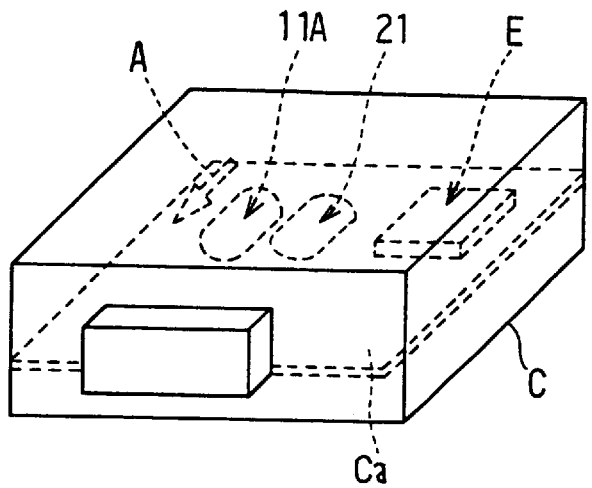
FIG. 6 is a perspective view showing a state in which each circuit in FIG. 5 is stored in a casing.
Figure 7A:
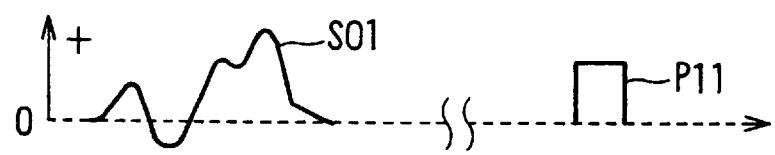
FIG. 7A is a timing diagram of an acceleration signal and a pseudo signal of a G sensor.
Figure 7B:
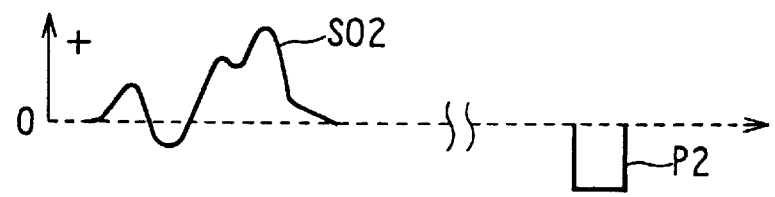
FIG. 7B is a timing diagram of an acceleration signal and a pseudo signal of another G sensor 21.
Figure 7C:
FIG. 7C is a timing diagram of the microcomputer control signal.

The G sensor 21 is mounted on the circuit board Ca to detect vehicle acceleration in the direction of arrow A in FIG. 6 and to generate an acceleration signal (see reference numeral SO2 in FIG. 7B).

Receiving the control signal CS (FIG. 7C) from the microcomputer 30 described in the first embodiment, the pseudo signal generating section 21b generates a pulse-width pseudo signal. The inverter 21c inverts the pseudo signal from the pseudo signal generating section 21b to generate an inverted signal (hereinafter referred to as a pseudo signal P2. See FIG. 7B) and to output the signal through the acceleration detecting section 21a. As a result, the acceleration detecting section 21a outputs the acceleration signal SO2 or the pseudo signal P2 from the same output terminal.

Here, the pseudo signal P2 has a negative polarity, which is opposite from that of the positive part of the acceleration signal SO2.

The signal processing circuit 22 amplifies the acceleration signal SO2 to generate a processed acceleration signal and amplifies the pseudo signal P2 to generate a processed pseudo signal. The A-D converter 20A converts the processed acceleration signal or the processed pseudo signal of the signal processing circuit 12 into a digital signal to generate a first acceleration voltage or a first pseudo voltage. The A-D converter 20A also converts the processed acceleration signal or the processed pseudo signal of the signal processing circuit 22 into a digital signal to generate a second acceleration voltage or a second pseudo voltage.

However, the A-D converter 20A converts the respective processed acceleration signals of both signal processing circuits 12, 22 so that the first and second acceleration voltages have polarities opposite from each other. The A-D converter 20A also converts the respective processed pseudo signals of both signal processing circuits 12, 22 so that the first and second pseudo voltages have polarities opposite from each other.

In this embodiment, the A-D converter 20A is mounted on the circuit board Ca instead of the A-D converter 20 described in the first embodiment together with the microcomputer 30 (see reference numeral (E) in FIG. 6).

Figure 8:
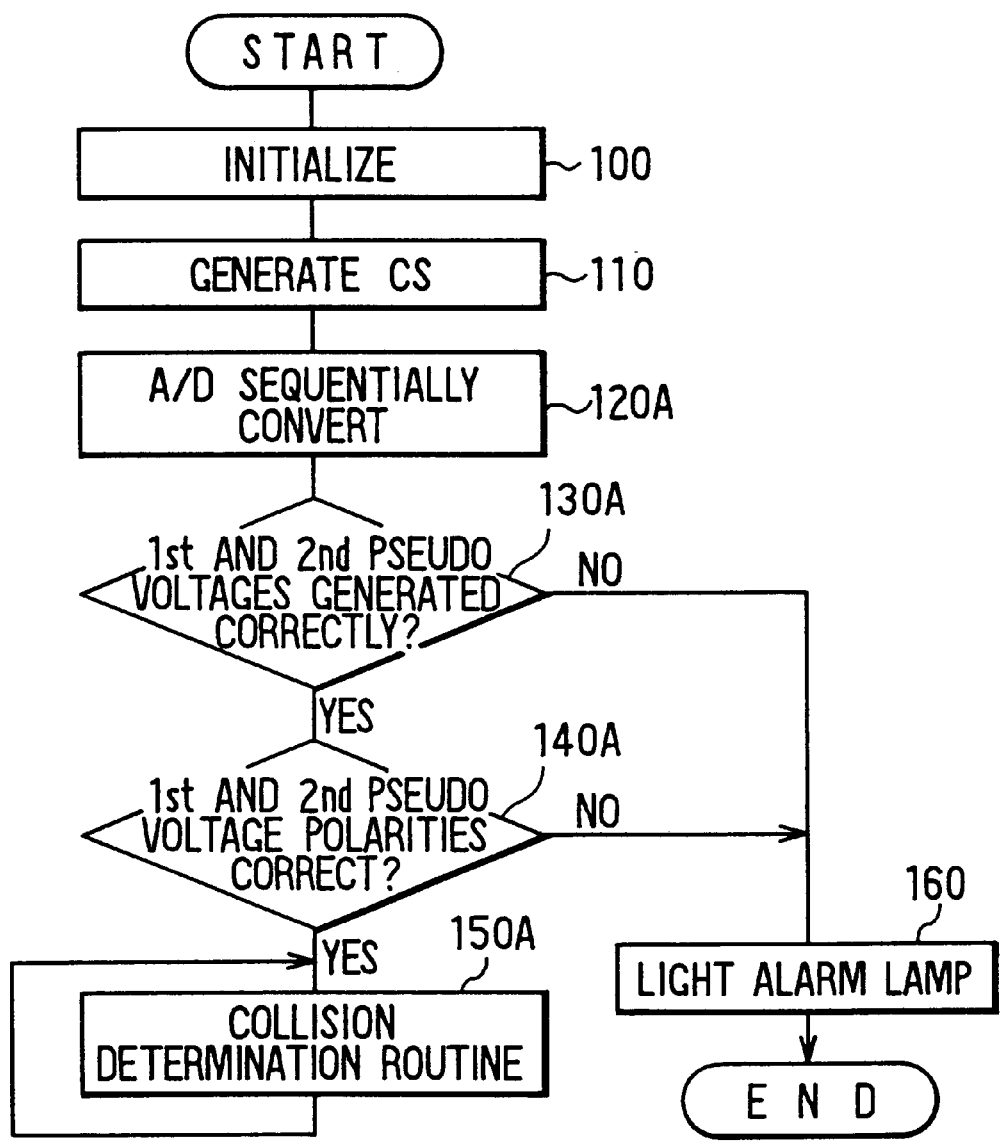
FIG. 8 is a flow diagram showing an operation of the microcomputer in FIG. 5.
Figure 9:
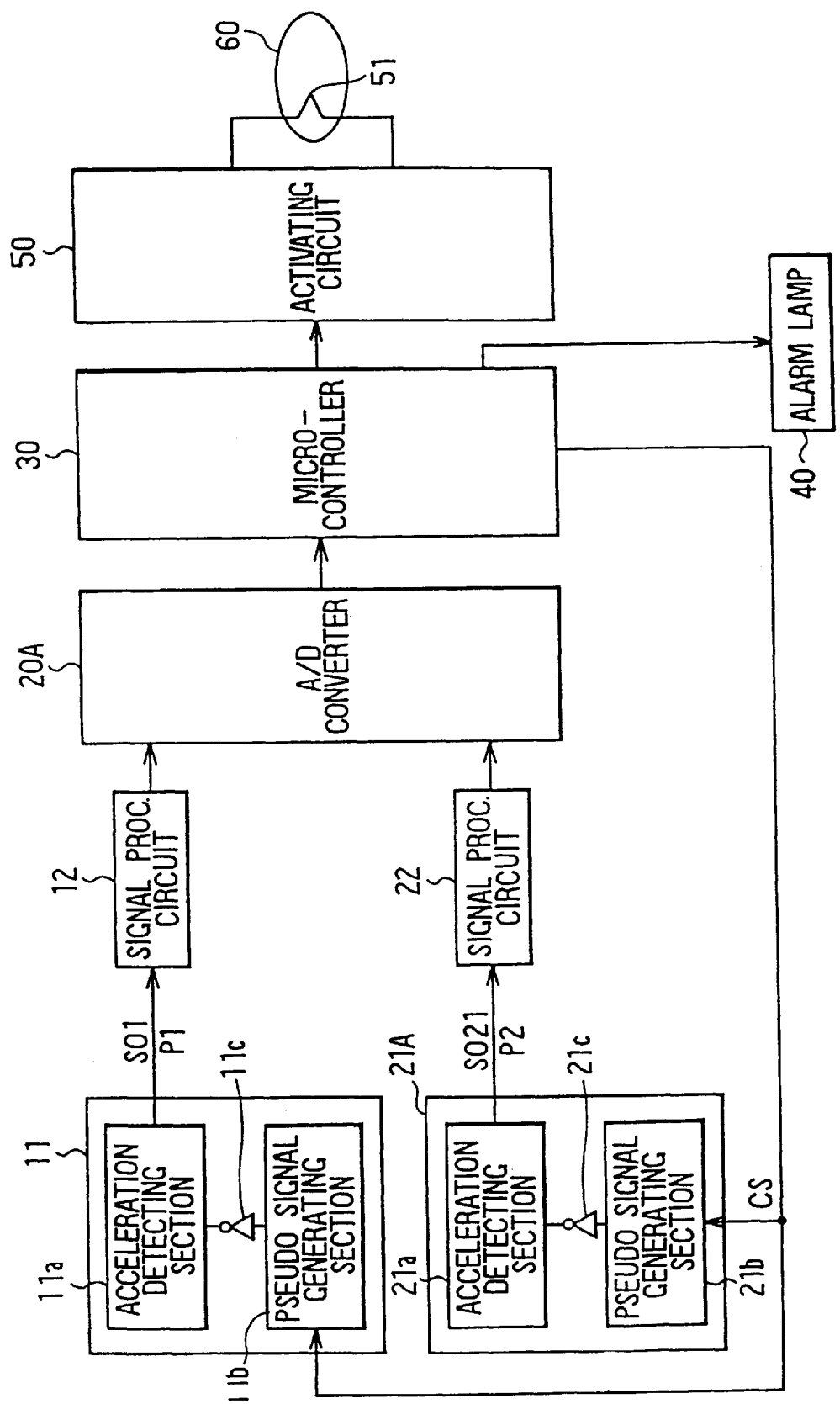
FIG. 9 is a block diagram showing a third embodiment of the invention.

In the second embodiment, the microcomputer 30 executes a computer program, in accordance with a flow diagram shown in FIG. 8. During the execution, the microcomputer 30 implements arithmetic processing necessary for controlling the both G sensors 11A and 21, the fault-determining process and the collision-determining process based on the output of the A-D converter 20A and the process for controlling the alarm lamp 40.

When the control signal CS is output at Step 110 in the same manner as the first embodiment, the control signal CS is output from the microcomputer 30 to the pseudo signal generating section 11b and the pseudo signal generating section 21b of the G sensor 11A.

Then, based on the control signal CS, the pseudo signal generating section 11b outputs the pseudo signal P11 through the acceleration detecting section 11a. The pseudo signal generating section 21b also outputs the pseudo signal P2 through the inverter 21c and the acceleration detecting section 21a.

Subsequently, the pseudo signal P11 from the acceleration detecting section 11a is processed by the signal processing circuit 12 and is output as the processed pseudo signal. The pseudo signal P2 from the acceleration detecting section 21a is processed by the signal processing circuit 22 and is output as the processed pseudo signal.

Next, the respective pseudo signals from the both signal processing circuits 12, 22 are converted sequentially into digital signals by the A-D converter 20A and are input sequentially to the microcomputer 30 as first and second pseudo voltages at Step 120A.

At Step 130A, it is determined whether or not the first and second pseudo voltages are generated correctly from the A-D converter 20A. When both pseudo voltages are correctly generated as described above, a YES determination is generated at Step 130A, indicating that the A-D converter 20A is functioning properly.

It is then determined whether the respective polarities of the first and second pseudo voltages described above are correct at Step 140A. Here, the pseudo signal P11 of the acceleration detecting section 11a is positive and the pseudo signal P2 of the acceleration detecting section 21a is negative. Accordingly, the processed pseudo signal output from the signal processing circuit 12 is positive and the processed pseudo signal output from the signal processing circuit 22 is negative.

Accordingly, when both first and second pseudo voltages of the A-D converter 20A have values corresponding to both processed pseudo signals, the polarities of the pseudo voltages are both correct, indicating that both acceleration detecting circuits 10, 20A are functioning properly. At this time, a YES determination is generated at Step 130A.

Subsequently, the collision determination routine 150A is initiated. When both G sensors 11A, 21 generate acceleration signals SO1, SO2, respectively, from the acceleration detecting sections 11a, 21a, both signal processing circuits 12, 22 output the processed acceleration signals, respectively. Then, each of the processed acceleration signals are converted sequentially into digital signals by the A-D converter 20A and are input sequentially to the microcomputer 30 as the first and second acceleration voltages.

Based on the first and second acceleration voltages, the microcomputer 30 determines whether or not a condition (e.g., a logical product of maximum values of the acceleration voltages) required to activate the 15 airbag mechanism 60 exists. When it is determined that the condition of logical product exists, the activating circuit 50 activates the squib 51, thereby activating the airbag mechanism 60 and expanding the airbag. As a result, a vehicle passenger is reliably protected.

Further, even if the microcomputer 30 erroneously generates the control signal CS, one of the outputs of the A-D converter 20A has a value that will not activate the air bag mechanism 60, as one of the pseudo signals P11, P2 generated by the G sensors 11A, 21 has a polarity opposite from the polarity of the corresponding acceleration signal. Accordingly, the air bag mechanism 60 will not be erroneously activated.

A NO determination is generated at Step 130A when at least one of the first and second pseudo voltages from the A-D converter 20A is not generated correctly in Step 130A prior to a YES determination is generated at Step 140A as described above. Such a NO determination indicates that the mechanism is not functioning properly.

In addition, a NO determination is generated at Step 140A when the polarities of the first and second pseudo voltages do not match, indicating that at least one of the acceleration detecting circuits 10A and 20 is malfunctioning.

Consequently, the alarm lamp 40 is lit at Step 160 in the same manner as in the first embodiment to notify the driver that the device is not working properly.

Because the polarity of the positive part of the acceleration signal SO2 is opposite from the polarity of the pseudo signal P2 in the second embodiment as described above, the air bag mechanism 60 will not be erroneously activated, as the pseudo signal P2 is generated prior to the collision judgment processing routine at Step 150A.

Third Embodiment

FIGS. 9–12 show a third embodiment of the present invention in which an acceleration detecting circuit is utilized in addition to the acceleration detecting circuit described in the first embodiment, and an A-D converter 20A described in the second embodiment is adopted instead of the A-D converter 20 described in the first embodiment.

Although the acceleration detecting circuit 20A' has the same structure as that of the acceleration detecting circuit 20 described in the second embodiment, a G sensor 21A corresponding to the G sensor 21 is mounted on the circuit board Ca so that it has a detecting direction indicated by an arrow B in FIG. 10.

Therefore, the acceleration detecting section 21a generates an acceleration signal SO21 (see FIG. 11B) in the G sensor 21A. This acceleration signal SO21 has a polarity opposite from that of the acceleration signal SO1. The structure other than is the same with the second embodiment.

The polarity of the positive part of the acceleration signal SO1 is opposite from the polarity of the pseudo signal P1 as described above. Therefore, the air bag mechanism 60 is not erroneously activated based on the pseudo signal P1 when a NO determination is generated at Steps 130A and 140A.

Also, the polarities of both acceleration signals SO1 and SO2 are different from each other. Therefore, when the A-D converter 20A malfunctions and when one of its converted values becomes a large value, the other converted value becomes a small value. Consequently, the an airbag mechanism activation condition does not exist, and the air bag mechanism 60 is not activated erroneously due to the malfunction of the A-D converter 20A.

Because the acceleration detecting sections 11a, 21a of both G sensors 11, 21A are mounted on the circuit board Ca to have detecting directions opposite from each other, the above-mentioned effect may be achieved by adopting the same elements as G sensors 11, 21A as shown in the second embodiment.

Figure 13A:
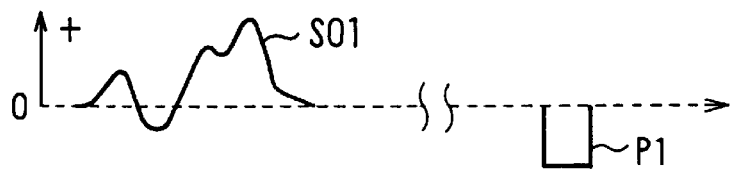
FIG. 13A is a timing diagram of the acceleration signal and the pseudo signal of a G sensor.
Figure 13B:
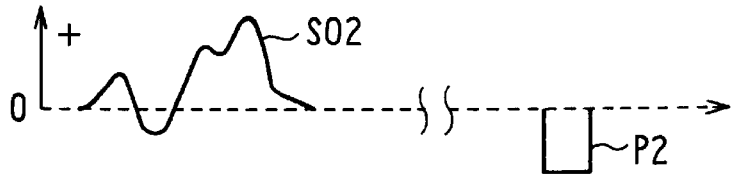
FIG. 13B is a timing diagram of the acceleration signal and the pseudo signal of another G sensor.
Figure 13C:

FIG. 13 shows a modified example of the third embodiment. The G sensor 21A described in the third embodiment is mounted on the circuit board Ca to have a detecting direction indicated by the arrow A in FIG. 10 within the acceleration detecting section 21a in the modified example. Therefore, the acceleration detecting section 21a generates the same acceleration signal SO2 described in the second embodiment. The structure other than that is the same as the third embodiment.

The polarity of the positive part of the acceleration signal SO2 is opposite from that of the pseudo signal P2 in the modified example, in addition to the polarity of the positive part of the acceleration signal SO1 being opposite from the polarity of the pseudo signal P1. Therefore, the air bag mechanism 60 will not be activated erroneously by the pseudo signals P1 and P2 after a NO determination is generated at Steps 130A and 140A. Therefore, the reliability of the air bag mechanism 60 is further enhanced.

Fourth Embodiment

Figure 15A:
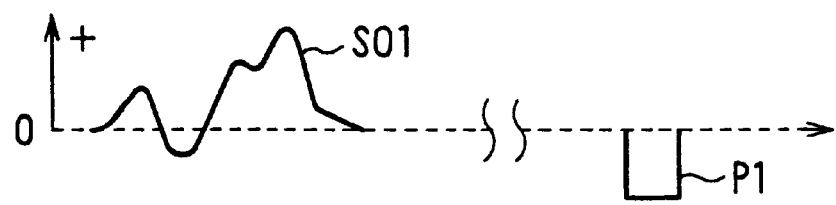
FIG. 15A is a timing diagram of the acceleration signal and the pseudo signal of a G sensor.
Figure 15B:
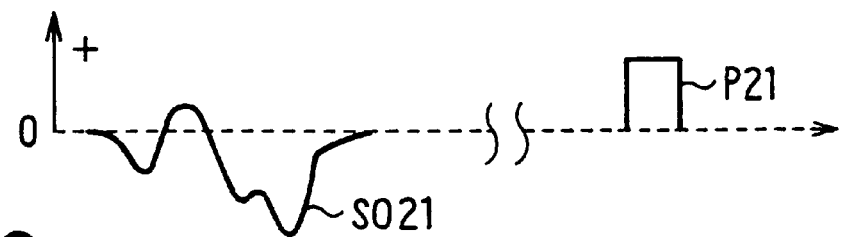
FIG. 15B is a timing diagram of an acceleration signal and a pseudo signal of another G sensor.
Figure 15C:
FIG. 15C is a timing diagram of the microcomputer control signal.

FIGS. 14 and 15 show a fourth embodiment in which an acceleration detecting circuit 20B is adopted instead of the acceleration detecting circuit described in the third embodiment. The acceleration detecting circuit comprises a G sensor 21B as well as the signal processing circuit 22 described in the third embodiment.

The G sensor 21B has a structure in which the inverter 21c shown in the third embodiment is eliminated. In the G sensor 21B, the pseudo signal generating section 21b outputs a pseudo signal P21 based on the signal CS (see FIG. 15B) and having a positive polarity to the signal processing circuit 22 via the acceleration detecting section 21a. The G sensor 21B is mounted on the circuit board Ca with the detecting direction in the direction of arrow A in FIG. 10 in the same manner as the G sensor 21A.

In the fourth embodiment, the acceleration signal SO1 from the acceleration detecting section 11a has a polarity opposite from that of the acceleration signal SO21, and the pseudo signal P1 has a polarity opposite from that of the pseudo signal P21. Further, the positive part of the acceleration signal SO1 has a polarity opposite from that of the pseudo signal P1, and the positive part of the acceleration signal SO21 has a polarity opposite from that of the pseudo signal P21.

Figure 12:
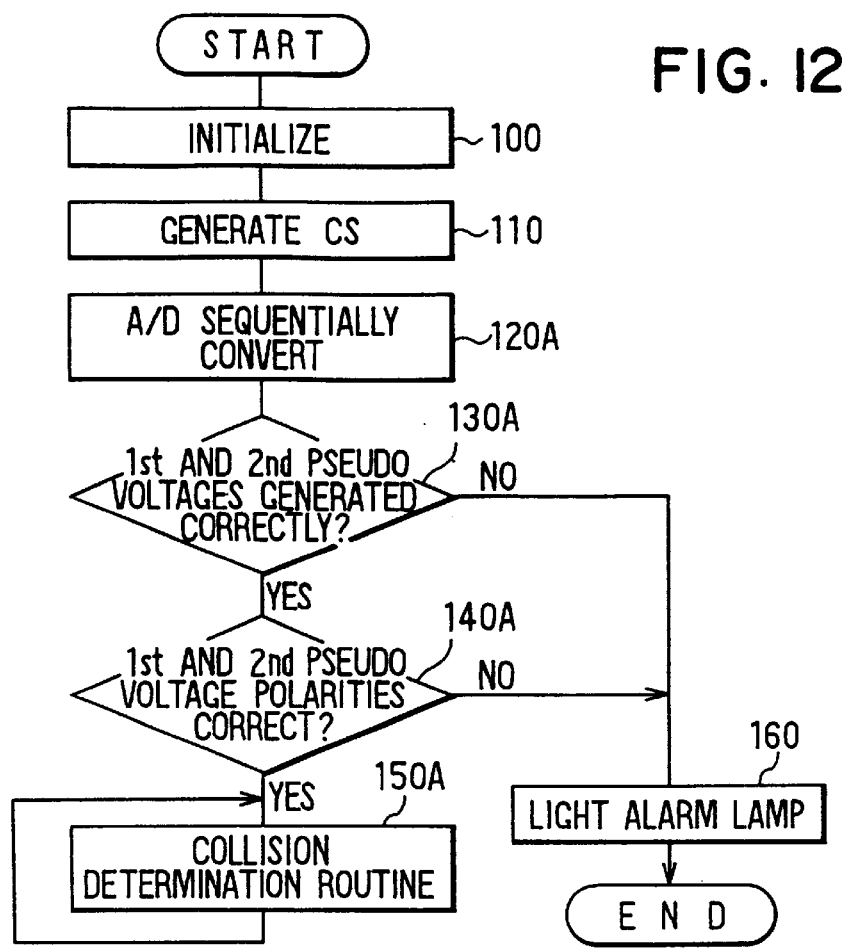
FIG. 12 is a flow diagram showing an operation of the microcomputer in FIG. 9.

As a result, system reliability is further enhanced as compared to the third embodiment in determining whether the A-D converter 20A and both acceleration detecting circuits 10, 20B are out of order on and after Step 120A based on the control signal Cs (see FIG. 12). System reliability is also enhanced regarding prevention of erroneous operation of the airbag mechanism 60 due to the erroneous generation of the control signal CS in at step 150A in the crash determination routine. All other features are the same as those in the third embodiment.

Fifth Embodiment

FIG. 16 shows a fifth embodiment of the present invention in which the acceleration detecting circuits 10B, 20C are utilized instead of the acceleration detecting circuits described in the third embodiment. The acceleration detecting circuit 10B comprises a G sensor 11B and the signal processing circuit 12. The G sensor 11B has a structure in which an inverter 11C and an output circuit 11d arc added to the G sensor 11 described in the fourth embodiment (see FIG. 14).

In the fifth embodiment, the acceleration detecting section 11a generates the acceleration signal through the output circuit 11d. The pseudo signal generating section 11b generates the pseudo signal through the inverter 11c, the acceleration detecting section 11a and the output circuit 11d.

The acceleration detecting circuit 20C comprises a G sensor 21C and the signal processing circuit 22. The G sensor 21C has a structure in which the output circuit 21d is added to the G sensor 21B described in the fourth embodiment.

The acceleration detecting section 21a generates the acceleration signal through the output circuit 21d. The pseudo signal generating section 21b also generates the pseudo signal through the acceleration detecting section 21a and the output circuit 21d. The output circuits 11d, 21d are not the same circuit, and both G sensors 11B, 21C are mounted on the circuit board Ca so that both output circuits 11d, 21d are positioned opposite from each other.

In the fifth embodiment, directions of change of the signals in the acceleration detecting circuits 10B, 20C change so as to have the same polarity when the acceleration detecting circuits 10B, 20C are exposed to external noises and electromagnetic waves. Therefore, the directions of change of the signals change in directions opposite from each other in terms of vehicle acceleration.

Accordingly, it is possible to prevent the acceleration detecting circuits 10B, 20C from erroneously indicating a vehicle collision state when the acceleration detecting circuits 10B, 20C are exposed to external noises and electromagnetic waves. As a result, it becomes possible to provide a collision-determining device that is highly reliable, even in the presence of external noise and electromagnetic waves.

Sixth Embodiment

FIG. 17 shows a sixth embodiment of the present invention. In the sixth embodiment, a G sensor 13 and a signal processing circuit 14 are utilized rather than the G sensor 11 and the signal processing circuit 12 described in the first embodiment (see FIG. 1).

The G sensor 13 is structured so that the inverter 11c and the pseudo signal generating section 11b are eliminated from the G sensor 11. Accordingly, the G sensor 13 is composed of only the acceleration detecting section 11a and generates only the acceleration signal SO1 generated by the G sensor 11.

The signal processing circuit 14 comprises a signal processing section 14a and the inverter 11c and the pseudo signal generating section 11b of the G sensor 11 described above.

The signal processing section 14a amplifies the acceleration signal SO1 from the G sensor 13 to generate a processed acceleration signal, and outputs it to the A-D converter 20. It also amplifies the pseudo signal P1 from the inverter 11c to generate a processed pseudo signal, and outputs it to the A-D converter 20.

It should be noted that the pseudo signal generating section 11b generates a pulse-width pseudo signal in the same manner as described in the first embodiment. All other structure is also the same as the first embodiment.

In the sixth embodiment arranged as described above, the signal processing circuit 14 is determined to be properly functioning when a YES determination is made at Step 140 in FIG. 4 in the same manner as with the first embodiment. The signal processing circuit 14 is determined to not be functioning properly when a NO determination is made at Step 140.

Accordingly, it is possible to determine correctly whether or not the signal processing circuit 14 is out of order by providing the inverter 11c and the pseudo signal generating section 11b in the signal processing circuit 14 as described above. The other operations and effects are the same as those described in the first embodiment.

Seventh Embodiment

FIG. 18 shows a seventh embodiment in which a G sensor 15 and a signal processing circuit 16 are utilized instead of the G sensor 11A and the signal processing circuit 12 described in the second embodiment (see FIG. 5), and a G sensor 23 and a signal processing circuit 24 are adopted instead of the G sensor 21 and the signal processing circuit 22 described in the second embodiment.

The G sensor 15 has a structure in which the pseudo signal generating section 11b is eliminated from the G sensor 11A described above. Accordingly, the G sensor 15 is composed of only the acceleration detecting section 11a and generates only the acceleration signal SO1. The signal processing circuit 16 comprises a signal processing section 16a and the pseudo signal generating section 11b of the G sensor 11A described above.

The signal processing section 16a amplifies the acceleration signal SO1 from the G sensor 15 to generate a processed acceleration signal, and outputs it to the A-D converter 20A. The section 16a also amplifies the pseudo signal P11 from the pseudo signal generating section 11b to generate a processed pseudo signal, and outputs it to the A-D converter 20A. The pseudo signal generating section 11b generates the pseudo signal P11 by receiving the control signal CS from the microcomputer 30 in the same manner with the second embodiment.

The G sensor 23 has a structure in which the inverter 21c and the pseudo signal generating section 21b are eliminated from the G sensor 21 described in the second embodiment. Accordingly, the G sensor 23 is composed of only the acceleration detecting section 21a and generates only the acceleration signal SO2 generated by the G sensor 21.

The signal processing circuit 24 comprises a signal processing section 24a and the inverter 21c and the pseudo signal generating section 21b of the G sensor 21 described above. The signal processing section 24a amplifies the acceleration signal SO2 from the G sensor 23 to generate a processed acceleration signal, and outputs it to the A-D converter 20A. The section 24a also amplifies the pseudo signal P2 from the inverter 21c to generate a processed pseudo signal, and outputs it to the A-D converter 20A.

It should be appreciated that the pseudo signal generating section 21b generates the pulse-width pseudo signal and outputs it to the inverter 21c to generate the pseudo signal P2 from the inverter 21c by receiving the control signal CS from the microcomputer 30 in the same manner as in the second embodiment. The structure other than that described above is substantially the same as in the second embodiment.

When the processed pseudo signals of the signal processing circuits 16, 24 are positive and negative, respectively, at Step 140A (see FIG. 8) described in the second embodiment, a YES determination is generated in the seventh embodiment arranged as described above, thereby indicating that both signal processing circuits 16 and 24 are functioning properly. On the other hand, when a NO determination is generated at Step 140A, at least one of the signal processing circuits 16 and 24 is not functioning properly.

The seventh embodiment enables a collision determination to be accurately made whether or not the signal processing circuits 16, 24 are functioning properly, instead of the whether or not the G sensors 11A and 21 are functioning properly, as in the second embodiment, as the signal processing circuits 16, 24 generate the processed pseudo signal based on the control signal of the microcomputer 30. The other operations and effects are the same as those in the second embodiment.

Eighth Embodiment

Figure 19:
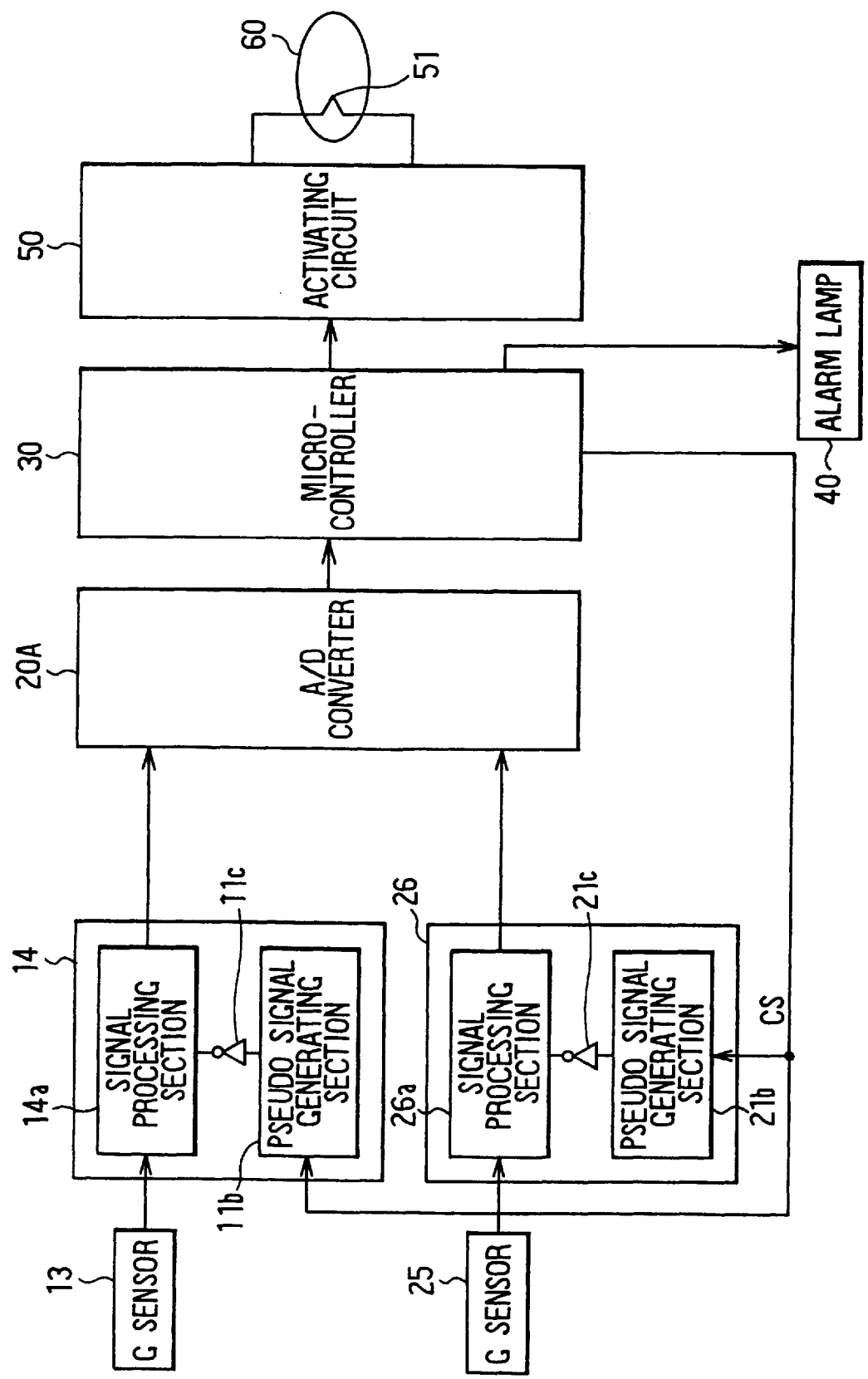
FIG. 19 is a block diagram showing an eighth embodiment of the present invention.
Figure 21A:
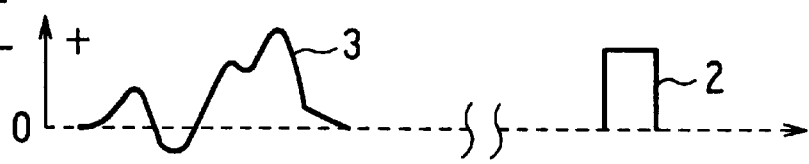
FIG. 21A is a timing diagram of an acceleration signal and a pseudo signal of a G sensor in a conventional collision-determining device.
Figure 21B:
FIG. 21B is a timing diagram of a control signal in the collision-determining device.

FIG. 19 shows an eighth embodiment of the present invention. In the eighth embodiment, the G sensor 13 and the signal processing circuit 14 described in the sixth embodiment (see FIG. 17) are utilized. Further, a G sensor 25 and a signal processing circuit 26 are utilized instead of the G sensor 21A and the signal processing circuit 22 described in the third embodiment (see FIG. 9).

The signal processing circuit 14 generates the processed acceleration signal and the processed pseudo signal via the signal processing section 14a and outputs the processed signals to the A-D converter 20A in the same manner as in the sixth embodiment.

The G sensor 25 has a structure in which the inverter 21c and the pseudo signal generating section 21b are eliminated from the G sensor 21A described above. Accordingly, the G sensor 25 is composed of only the acceleration detecting section 21a and generates only the acceleration signal SO21 generated by the G sensor 21A.

The signal processing circuit 26 comprises a signal processing section 26a and the inverter 21c and the pseudo signal generating section 21b of the G sensor 21A described above.

The signal processing section 26a amplifies the acceleration signal SO21 from the G sensor 25 to generate a processed acceleration signal and outputs it to the A-D converter 20A. The section 26a also amplifies the pseudo signal P2 from the inverter 21c to generate a processed pseudo signal and outputs it to the A-D converter 20A. It is noted that the pseudo signal generating section 21b generates the pulse-width pseudo signal by receiving the control signal CS from the microcomputer 30, and generates the pseudo signal P2 from the inverter 21c in the same manner as in the third embodiment. The structure other than that described above is substantially the same as in the third embodiment.

The eighth embodiment arranged as described above enables a collision determination to be made whether the signal processing circuits 14, 26 are functioning properly, rather than the G sensors 11 and 21A described in the third embodiment, by implementing the process in accordance with the flow diagram in FIG. 12. The other operations and effects are the same as those in the third embodiment.

It is noted that the eighth embodiment may be modified as follows. Specifically, the G sensor 25 described in the eighth embodiment is mounted on the circuit board Ca so as to have a detecting direction as indicated by the arrow A in FIG. 10. Therefore, the G sensor 25 generates the acceleration signal SO2 in the same manner as described in the second embodiment. The structure other than the above is the same as in the eighth embodiment.

In the modification arranged as described above, the polarity of the positive part of the acceleration signal SO2, i.e., the polarity of the processed acceleration signal of the signal processing circuit 26, is opposite from the polarity of the processed pseudo signal of the signal processing circuit 26. In addition, the polarity of the positive part of the acceleration signal SO1, i.e., the polarity of the processed acceleration signal of the signal processing circuit 14, is opposite that of the processed pseudo signal of the signal processing circuit 14.

Therefore, the airbag mechanism 60 is not activated erroneously due to a NO determination at Steps 130A and 140A in FIG. 12. Thus, reliability of the airbag mechanism 60 is further enhanced.

Ninth Embodiment

FIG. 20 shows a ninth embodiment of the invention. In the ninth embodiment, the G sensor 13 and the signal processing circuit 14 described in the sixth embodiment (see FIG. 17) are adopted instead of the G sensor 11 and the signal processing circuit 12 described in the fourth embodiment (see FIG. 14). Also, a G sensor 27 and a signal processing circuit 28 are adopted instead of the G sensor 21B and the signal processing circuit 22 described in the fourth embodiment.

The G sensor 27 has a structure in which the pseudo signal generating section 21b is eliminated from the G sensor 21B described above. Therefore, the G sensor 27 is composed of only the acceleration detecting section 21a and generates only the acceleration signal generated from the G sensor 21B.

The signal processing circuit 14 generates the processed acceleration signal and the processed pseudo signal and outputs the signals to the A-D converter 20A in the same manner as described above. The signal processing circuit 28 comprises a signal processing section 28a and the pseudo signal generating section 21b of the G sensor 21B described above.

The signal processing section 28a amplifies the acceleration signal from the G sensor 27 to generate the processed acceleration signal, and outputs it to the A-D converter 20A. The section 28a also amplifies the pseudo signal from the pseudo signal generating section 21b to generate the processed pseudo signal, and outputs it to the A-D converter 20A. It is noted that the pseudo signal generating section 21b generates the pulse-width pseudo signal P21 by receiving the control signal CS from the microcomputer 30 in the same manner with the fourth embodiment. The structure other than that is substantially the same as in the fourth embodiment.

It is possible to determine whether or not both signal processing circuits 14, 28 are functioning properly, instead of the both G sensors, substantially in the same manner with the eighth embodiment. The other operations and effects are the same as those in the fourth embodiment.

It is noted that the invention may be applied and embodied not only in the air bag system described in the above respective embodiments but also in a vehicle belt tensioner or the like. Also, converters may be stored in the microcomputer 30 as the A-D converters 20, 20A. In addition, the number of the acceleration detectors is not limited to one or two as described in the respective embodiments, and may be three or more.

In such a case, it is possible to arrange such that at least two acceleration detecting circuits generate acceleration signals having opposite polarities from each other by the G sensors, and generate pseudo signals having the polarity opposite from the polarity of those acceleration signals based on the control signal. It is also possible to arrange such that at least two acceleration detecting circuits generate the pseudo signals having opposite polarities from each other by the respective G sensors based on the control signal.

Although the invention has been describe as being applied as a collision-determining circuit for determining a collision by detecting acceleration produced in the longitudinal direction of the vehicle, the invention is applicable to a collision-determining device which determines a vehicle collision based on acceleration produced in the right and left direction of the vehicle.

While the preferred embodiments of the invention have been described, variations thereto will occur to those skilled in the art within the scope of the present inventive concepts delineated by the following claims.

What is claimed is:

1. A collision-determining circuit for a vehicle passenger protection system, comprising:

an acceleration detector for detecting a vehicle acceleration and for generating an acceleration signal in response thereto;

a collision-determining device for determining whether a vehicle collision has occurred based on the acceleration signal;

a signal generator for generating a pseudo signal based on a received control signal, the pseudo signal having a different polarity than the acceleration signal during a correct circuit operation such that said collision-determining device is not responsive to said pseudo signal to determine the occurrence of a collision and inadvertently deploy said passenger protection system during said correct circuit operation; and a fault-determining device for determining circuit malfunction based on the pseudo signal.

2. The collision-determining circuit of claim 1, wherein the fault-determining device determines circuit malfunction when the pseudo signal and the acceleration signal are of like polarity, and determines normal circuit operation when the pseudo signal and the acceleration signal are of opposite polarity.

3. The collision-determining circuit of claim 1, further comprising an activation circuit for activating the passenger protection system during a vehicle collision, the fault-determining device inhibiting the activation circuit when the polarity of said acceleration signal is the same as the polarity of said pseudo signal.

4. The collision-determining circuit of claim 1, wherein the passenger protection system is a vehicle airbag system.

5. The collision-determining circuit of claim 1, wherein the signal generator is a component within the acceleration detector, the fault-determining device for determining malfunction of the acceleration detector.

6. The collision-determining circuit of claim 1, wherein the signal generator is a component of a signal processing circuit separate from the acceleration detector for processing the acceleration signal generated by the acceleration detector, and the fault-determining device is for determining malfunction of the signal processing circuit.

7. A collision-determining circuit for a vehicle passenger protection system, comprising:

first and second acceleration detectors for detecting vehicle acceleration and for generating respective first and second acceleration signals in response thereto;

a collision-determining device for determining whether or not the vehicle collision has occurred based on the first and second acceleration signals;

a fault-determining device for at least determining whether one or both of the first and second acceleration detectors are malfunctioning; and a signal generator for generating first and second pseudo signals based on a received control signal, the first pseudo signal having a different polarity than the first acceleration signal when the first acceleration detector is operating properly, the second pseudo signal having a different polarity than the second acceleration signal when the second acceleration detector is operating properly, whereby said collision-determining device is not responsive to said first or said second pseudo signal to determine the occurrence of a collision and inadvertently deploy said passenger protection system when a respective first or second acceleration detector is operating properly;

the fault-determining device determining circuit malfunction based on the first and second pseudo signals.

8. The collision-determining circuit of claim 7, wherein both the first and second acceleration detectors generate the first and second respective acceleration signals having like polarities.

9. The collision-determining circuit of claim 8, wherein the second acceleration signal has a polarity opposite that of the second pseudo signal during the circuit malfunction.

10. The collision-determining circuit of claim 7, wherein the first and second acceleration signals are opposite in polarity in response to vehicle deceleration during the vehicle collision; and the first acceleration signal is opposite in polarity from the first pseudo signal, and the second acceleration signal is opposite in polarity from the second pseudo signal.

11. The collision-determining circuit of claim 10, wherein the first and second acceleration detectors comprise first and second output circuits for outputting the first acceleration and pseudo signals, and the second acceleration and pseudo signals, respectively, the first and second output circuits being formed from the same circuit.

12. The collision-determining circuit of claim 11, wherein the first and second output circuits inhibit improper system deployment caused by one of noise and electromagnetic interference.

13. The collision-determining circuit of claim 7, wherein the first polarity relationships comprise the respective first and second acceleration signals being like in polarity in response to vehicle deceleration during the vehicle collision; and the second polarity relationships comprise the first and second acceleration signals being opposite in polarity from the respective first and second pseudo signals.

14. The collision-determining circuit of claim 7, wherein the first and second acceleration detectors comprise first and second acceleration sensors provided at predetermined vehicle locations so that the first acceleration sensor detects the vehicle acceleration in a direction opposite to a direction in which the second acceleration detector senses the vehicle acceleration.

15. The collision-determining circuit of claim 7, wherein the collisiondetermining device determines whether the vehicle collision has occurred only after the fault-determining device determines that respective polarities of the first and second pseudo signals are correct.

16. The collision-determining circuit of claim 7, wherein the faultdetermining device comprises in part an A-D converter for converting the first and second acceleration signals and the first and second pseudo signals into digital signals;

the collision-determining device determines whether the vehicle collision has occurred based on a digital conversion value of the first and second acceleration signals converted by the A-D converter; and the fault-determining device determines system malfunction based on a digital conversion value of the first and second pseudo signals converted by the A-D converter.

17. The collision-determining circuit of claim 16, wherein the faultdetermining device further comprises a microcomputer for determining whether the A-D converter has malfunctioned based on the polarities of the first and second acceleration signals.

18. The collision-determining circuit of claim 7, wherein the first and second acceleration detectors are two among at least three acceleration detectors which detect vehicle acceleration.

19. The collision-determining circuit of claim 7, further comprising a signal processor for processing the first and second pseudo signals to generate processed first and second pseudo signals, the fault-determining device determining the circuit malfunction based on the processed first and second pseudo signals.

20. The collision-determining device of claim 7, further comprising first and second signal processors for processing the first and second acceleration signals to generate processed first and second acceleration signals, and for processing the first and second pseudo signals to generate processed first and second pseudo signals, respectively;

the fault-determining device determining malfunction of the first and second signal processors based on the first and second processed pseudo signals.

21. The collision-determining circuit of claim 7, wherein the fault-determining device comprises in part an A-D converter for converting the first and second acceleration signals and the first and second pseudo signals into digital signals; and further comprising first and second signal processing devices for processing the first and second acceleration signals to generate first and second processed acceleration signals that are input into the A-D converter;

the collision-determining device for determining whether a collision has occurred based on the first and second processed acceleration signals;

the fault-determining device for determining malfunction of at least one of the first and second signal processing devices, and for determining malfunction of the A-D converter, based on the first and second processed pseudo signals.

22. A method for monitoring a vehicle airbag deployment system, comprising the steps of:

sending a control signal that causes a system component diagnostic signal to be generated in response thereto, said component diagnostic signal having a different polarity than a vehicle acceleration when a collision-determining circuit is operating properly;

determining whether system components are functioning properly based on the diagnostic signal, whereby the different polarity of said component diagnostic signal from said acceleration signal does not cause operation of vehicle air bag deployment system during proper operation of said collision-determining circuit.

23. A collision determining circuit for a vehicle passenger protection system, comprising:

a first and a second acceleration detecting means for detecting vehicle accelerations and producing respective first and second acceleration signals;

collision determining means for determining whether a vehicle collision or crash has occurred based on both of the first and second acceleration signals;

control signal producing means for producing first and second pseudo signals based on a control signal;

wherein either one of the first and second pseudo signals has a polarity which is opposite to a polarity of the other pseudo signal so that the collision determining means determines whether the collision has occurred based on either one of the first and second pseudo signals when either one of the first and second acceleration detecting means normally operates in order to not start the passenger protection system; and wherein a breakage determining means determines a circuit failure based on the first and second pseudo signal.

24. The collision-determining circuit of claim 23, wherein the breakage determining means determines circuit malfunction when either one of the first or second pseudo signals and a respective one of said acceleration signals are of like polarity, and determines normal circuit operation when either one of the first and second pseudo signals is opposite polarity with a respective one of said first or second acceleration signals.

25. The collision-determining circuit of claim 23, wherein the passenger protection system is a vehicle airbag system.

26. The collision-determining circuit of claim 23, wherein the control signal producing means is components within the first and second acceleration detecting means, the breakage determining means is for determining a malfunction of the acceleration detecting means.

27. The collision-determining circuit of claim 23, wherein the first and second acceleration signals arc opposite in polarity in response to vehicle deceleration during the vehicle collision; and the first acceleration signal is opposite in polarity from the first pseudo signal, and the second acceleration signal is opposite in polarity from the second pseudo signal.

28. The collision-determining circuit of claim 23, wherein the first and second acceleration detecting means comprise first and second acceleration sensors provided at predetermined vehicle locations so that the first acceleration sensor detects the vehicle acceleration in a direction opposite to a direction in which the second acceleration detector senses the vehicle acceleration.

* * * * *